United States Patent
Gocha et al.

(10) Patent No.: US 10,612,707 B2
(45) Date of Patent: Apr. 7, 2020

(54) QUICK CONNECT ASSEMBLY AND METHOD

(71) Applicant: COOPER-STANDARD AUTOMOTIVE INC., Novi, MI (US)

(72) Inventors: Kenneth Gocha, Flint Township, MI (US); Troy Owens, Davisburg, MI (US)

(73) Assignee: COOPER-STANDARD AUTOMOTIVE, INC., Novi, MI (US)

( * ) Notice: Subject to any disclaimer, the term of this patent is extended or adjusted under 35 U.S.C. 154(b) by 196 days.

(21) Appl. No.: 15/823,822

(22) Filed: Nov. 28, 2017

(65) Prior Publication Data

US 2019/0162346 A1    May 30, 2019

(51) Int. Cl.
*F16L 37/098* (2006.01)
*F16L 37/14* (2006.01)

(52) U.S. Cl.
CPC ................... *F16L 37/144* (2013.01)

(58) Field of Classification Search
CPC .... F16L 37/0985; F16L 37/26; F16L 27/0804
USPC ................................. 285/184, 282
See application file for complete search history.

(56) References Cited

U.S. PATENT DOCUMENTS

| | | | |
|---|---|---|---|
| 1,838,313 A | 12/1931 | Kohr | |
| 5,586,791 A * | 12/1996 | Kirchner | ............. F16L 37/0985 285/179 |
| 5,863,077 A | 1/1999 | Szabo et al. | |
| 5,893,589 A * | 4/1999 | Bleitz | .................. F16L 37/244 285/148.19 |

(Continued)

FOREIGN PATENT DOCUMENTS

| CN | 1894533 A | 1/2007 |
|---|---|---|
| CN | 102918316 A | 2/2013 |

(Continued)

OTHER PUBLICATIONS

Office Action dated May 22, 2018—U.S. Appl. No. 15/037,716, filed May 19, 2016.

(Continued)

*Primary Examiner* — David Bochna
(74) *Attorney, Agent, or Firm* — Stephen T. Olson; Harness, Dickey & Pierce, P.L.C.

(57) ABSTRACT

A quick connect assembly for releasably engaging an end-form including a tubular stem, a collar member and a retaining member. The tubular stem includes a radially extending flange formed proximate to an upper end thereof. The radially extending flange is formed to include a first plurality of locating features. The collar member is carried by the tubular stem and is rotatably adjustable relative to the tubular stem about a longitudinally extending axis to a plurality of indexed positions. The collar member includes an inwardly extending lip proximate a lower end thereof and further including a second plurality of locating features. The retaining member holds the radially extending flange of the tubular stem against the inwardly extending lip of the collar member. The first and second pluralities of locating features cooperate to prevent relative rotation between the collar member and the stem when the radially extending flange of the tubular stem is held against the inwardly extending lip of the collar member.

19 Claims, 4 Drawing Sheets

(56) References Cited

U.S. PATENT DOCUMENTS

| | | | |
|---|---|---|---|
| 5,947,531 A * | 9/1999 | Eckard | F16L 37/1205 |
| | | | 285/319 |
| 6,318,764 B1 * | 11/2001 | Trede | F16L 37/0841 |
| | | | 285/305 |
| 6,540,263 B1 | 4/2003 | Sausner | |
| 6,709,026 B2 * | 3/2004 | Sausner | F16L 37/144 |
| | | | 285/305 |
| 6,866,303 B2 | 3/2005 | Szabo et al. | |
| 7,552,948 B2 * | 6/2009 | Matsuno | F16L 37/0985 |
| | | | 285/308 |
| 7,823,930 B2 | 11/2010 | Feger et al. | |
| 8,113,549 B2 | 2/2012 | Bokuhn et al. | |
| 8,408,604 B2 | 4/2013 | Yamada et al. | |
| 9,777,876 B2 * | 10/2017 | Kaneko | F16L 37/144 |
| 9,816,658 B2 | 11/2017 | Ishizaka et al. | |
| 9,915,388 B2 | 3/2018 | Hatanaka | |
| 10,371,299 B2 * | 8/2019 | Leffler | F16L 37/26 |
| 2001/0048225 A1 | 12/2001 | Andre et al. | |
| 2002/0084652 A1 | 7/2002 | Halbrock et al. | |
| 2004/0036283 A1 | 2/2004 | Furuya | |
| 2005/0087981 A1 * | 4/2005 | Yamada | F16L 37/0985 |
| | | | 285/81 |
| 2012/0326435 A1 | 12/2012 | Okazaki | |
| 2014/0319820 A1 | 10/2014 | Takimoto et al. | |
| 2014/0339821 A1 | 11/2014 | Ishizaka et al. | |
| 2016/0040813 A1 | 2/2016 | Hatanaka | |
| 2016/0298800 A1 | 10/2016 | Gocha et al. | |
| 2017/0067588 A1 | 3/2017 | Chaupin et al. | |
| 2017/0146173 A1 | 5/2017 | Chaupin et al. | |
| 2017/0234469 A1 * | 8/2017 | Kondziella | F16L 37/0985 |
| | | | 285/308 |
| 2017/0284583 A1 * | 10/2017 | Eckard | F16L 37/0985 |
| 2017/0299100 A1 * | 10/2017 | Leffler | F16L 37/26 |
| 2017/0321827 A1 | 11/2017 | Lee et al. | |

FOREIGN PATENT DOCUMENTS

| | | |
|---|---|---|
| DE | 19946260 C1 | 1/2001 |
| EP | 1087169 A2 | 3/2001 |
| EP | 1369634 A1 | 12/2003 |
| EP | 1526320 A1 | 4/2005 |
| JP | 2004251319 A | 9/2004 |
| JP | 4236952 B2 | 3/2009 |
| JP | 2009257583 A | 11/2009 |
| JP | 2011174508 A | 9/2011 |
| JP | 2013133915 A | 7/2013 |
| WO | WO-2009119058 A1 | 10/2009 |
| WO | WO-2013099887 A1 | 7/2013 |
| WO | WO-2018019422 A1 * | 2/2018 ......... F16L 37/0985 |

OTHER PUBLICATIONS

International Search Report and Written Opinion regarding International Application No. PCT/US2014/068044, dated Feb. 23, 2015.
International Preliminary Report on Patentability regarding International Application No. PCT/US2014/068044, dated Jun. 16, 2016.
Office Action regarding Chinese Patent Application No. 201480065822.6, dated Apr. 12, 2017. Partial translation provided by CCPIT Patent and Trademark Law Offices.
Office Action regarding Japanese Patent Application No. 2016-535654, dated Sep. 4, 2018. Translation provided by Miyoshi & Miyoshi Patent Attorneys.
Office Action regarding U.S. Appl. No. 15/037,716, dated Oct. 9, 2018.
Office Action regarding U.S. Appl. No. 15/037,716, dated Jan. 24, 2019.
Search Report regarding European Patent Application No. 18182471.5, dated Feb. 18, 2019.

* cited by examiner

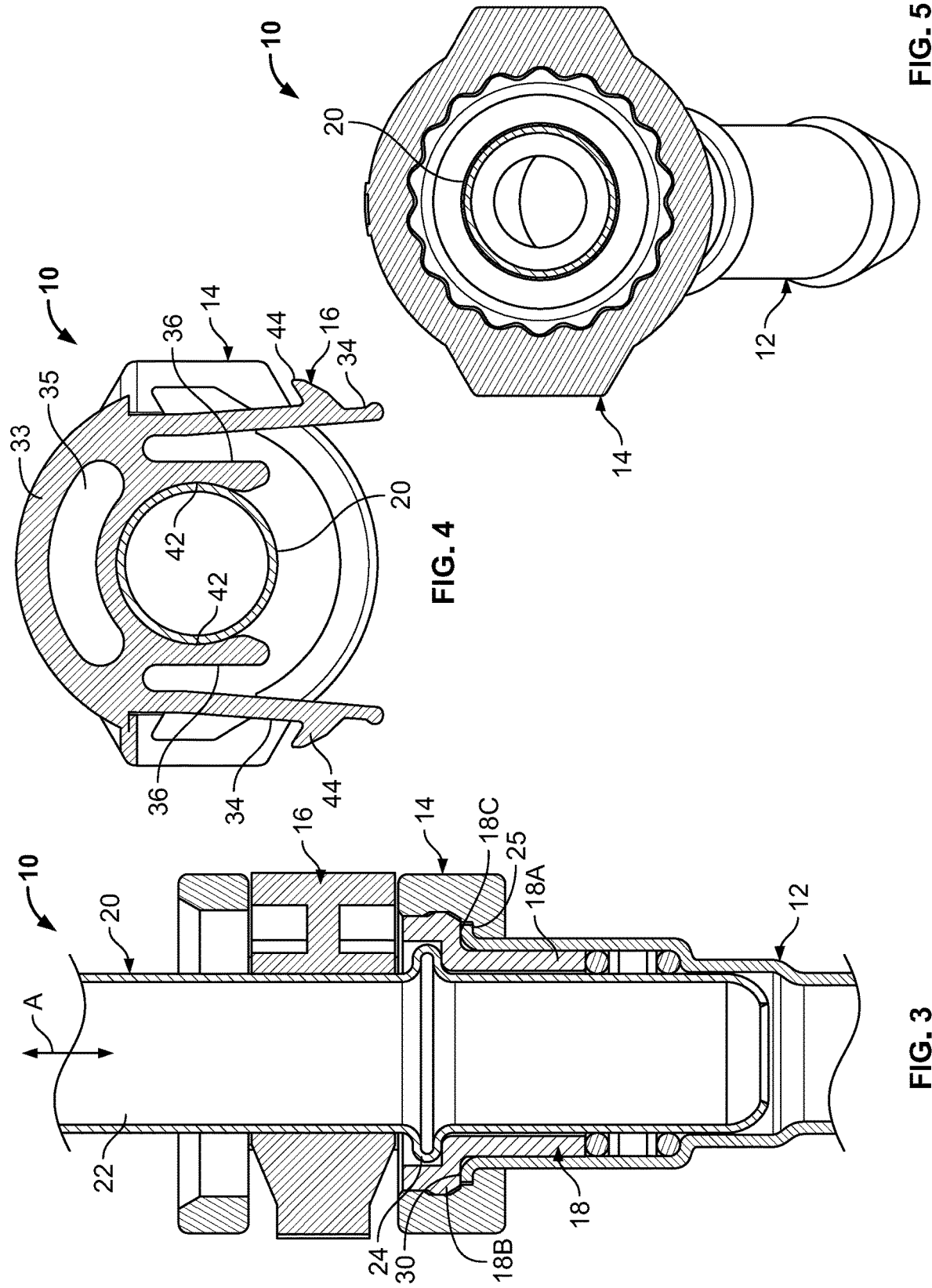

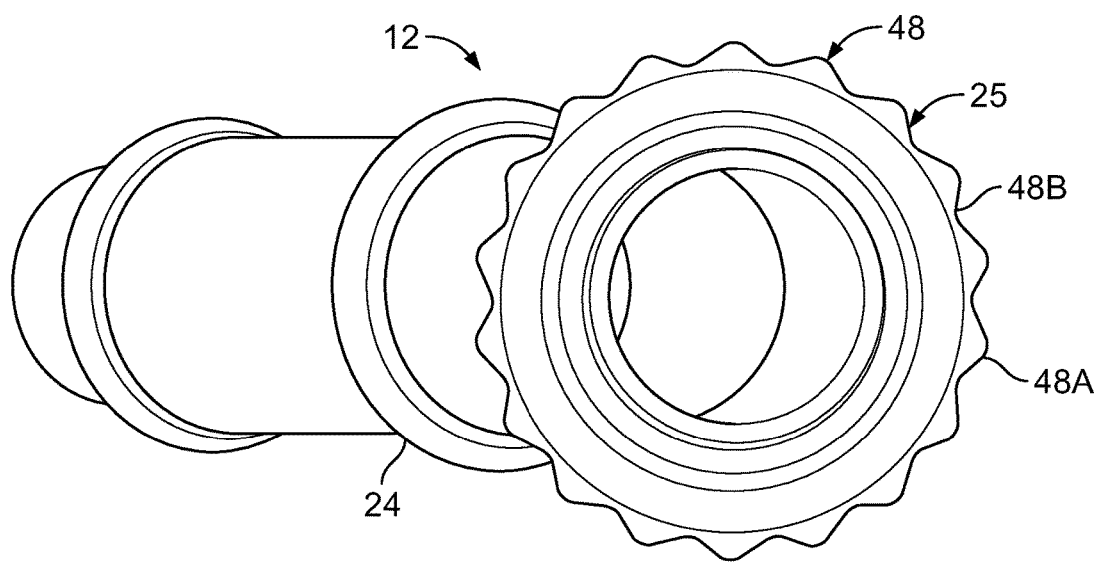
FIG. 6
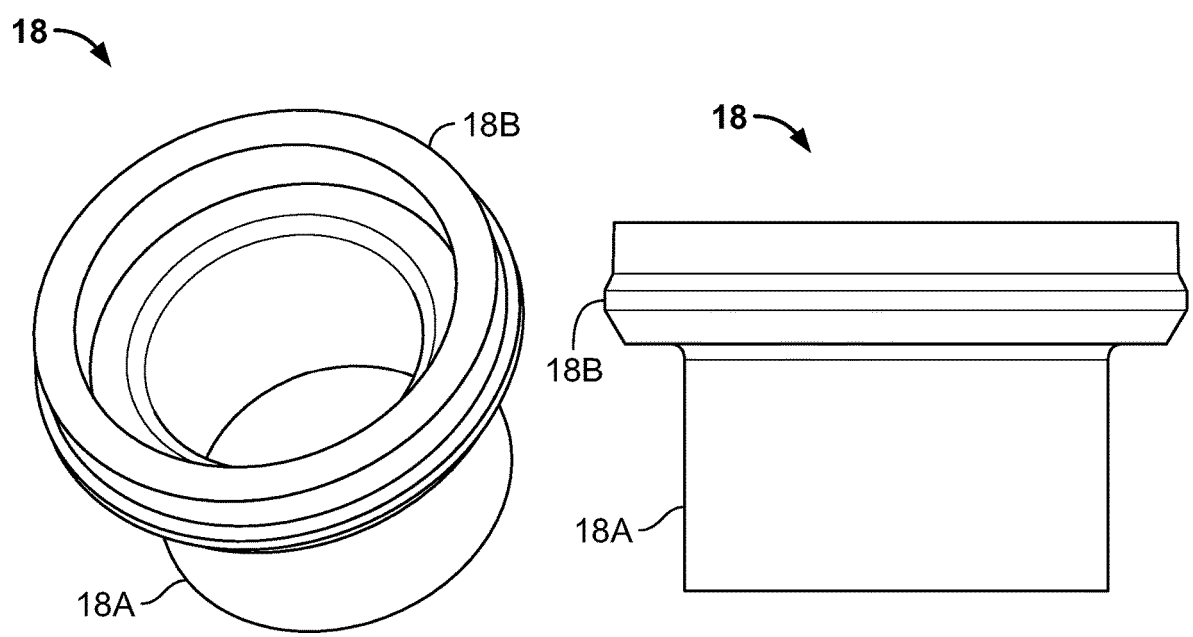
FIG. 7
FIG. 8

QUICK CONNECT ASSEMBLY AND METHOD

FIELD

The present teachings generally relate to quick connect assemblies for connecting and establishing fluid communication between tubular members. More particularly, the present teachings relate to a quick connector having collar positively located to a plurality of fixed positions. The present teachings also more particularly relate to a method of coupling a tubular stem with an endform.

BACKGROUND

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing.

One known quick connect assembly is shown and described in commonly assigned U.S. Publication No. 2016-0298800. This quick connect assembly generally includes a housing having a passage configured to receive an endform, and a retainer including a bridge. A beam extends from the bridge. Two retainer arms extend from the bridge to retain the male endform in the passage of the housing when the retainer is in an engaged position. Two guiding legs extend from the bridge that guide the retainer during movement to the engaged position. The bridge, the beam, the two retainer arms, and the two guiding legs are an integral unitary single piece component, and the beam contacts the endform when the retainer is in the engaged position. The housing may be freely rotated relative to a stem. U.S. Publication No. 2016-029880 is incorporated by reference as if fully set forth herein.

For certain applications, it may be desirable to positively fix the collar member to the stem such that relative rotation is precluded. It may also be desirable to rotationally adjust the collar relative to the stem prior to positively fixing the collar relative to the stem.

While known quick connectors, including the quick connector of U.S. Publication No. 2016-0298800, have generally proven to be satisfactory for their intended purposes, a continuous need for improvement remains in the pertinent art.

SUMMARY

In accordance with one particular aspect, the present teachings provide a quick connect assembly for releasably engaging an endform. The quick connect assembly includes a stem, a collar member and a retaining member. The collar member is carried by the stem and is rotatably adjustable relative to the tubular stem about a longitudinally extending axis to a plurality of indexed positions. The collar member is lockable relative to the tubular stem in each position of the plurality of indexed positions.

In accordance with another particular aspect, the present teachings provide a quick connect assembly for releasably engaging an endform including a tubular stem, a collar member and a retaining member. The tubular stem includes a radially extending flange formed proximate to an upper end thereof. The radially extending flange is formed to include a first plurality of locating features. The collar member is carried by the tubular stem and is rotatably adjustable relative to the tubular stem about a longitudinally extending axis to a plurality of indexed positions. The collar member includes an inwardly extending lip proximate a lower end thereof and further includes a second plurality of locating features. The retaining member holds the radially extending flange of the tubular stem against the inwardly extending lip of the collar member. The first and second pluralities of locating features cooperate to prevent relative rotation between the collar member and the stem when the radially extending flange of the tubular stem is held against the inwardly extending lip of the collar member.

In accordance with still yet another particular aspect, the present teachings provide a method of coupling a tubular stem with an endform. The method includes providing a quick connect assembly including a collar member and a retaining member. The method additionally includes rotatably adjusting the collar member relative to the tubular stem about a longitudinal axis to one of a plurality of indexed positions. The method further includes seating a radially extending flange of the tubular stem against an inwardly extending lip of the collar member such that a first plurality of locating features defined by the tubular stem cooperates with a second plurality of locating features of the collar member to prevent relative rotation between the tubular stem and the collar member.

Further areas of applicability will become apparent from the description provided herein. The description and specific examples in this summary are intended for purposes of illustration only and are not intended to limit the scope of the present disclosure.

DESCRIPTION OF THE DRAWINGS

The drawings described herein are for illustrative purposes only of selected embodiments and not all possible implementations, and are not intended to limit the scope of the present disclosure.

FIG. 3 is a cross-sectional view of the quick connect assembly of the present teachings taken along the line 3-3 of FIG. 2.

FIG. 4 is a cross-sectional view of the quick connect assembly of the present teachings taken along the line 4-4 of FIG. 2.

FIG. 5 is a cross-sectional view of the quick connect assembly of the present teachings taken along the line 5-5 of FIG. 2.

FIG. 6 is an end view of the stem of the quick connect assembly of the present teachings.

FIG. 7 is a perspective view of a top hat member of the quick connect assembly of the present teachings.

FIG. 8 is a side view of the top hat member of FIG. 7.

DETAILED DESCRIPTION OF VARIOUS ASPECTS

Example embodiments will now be described more fully with reference to the accompanying drawings.

Figures 1, 2:
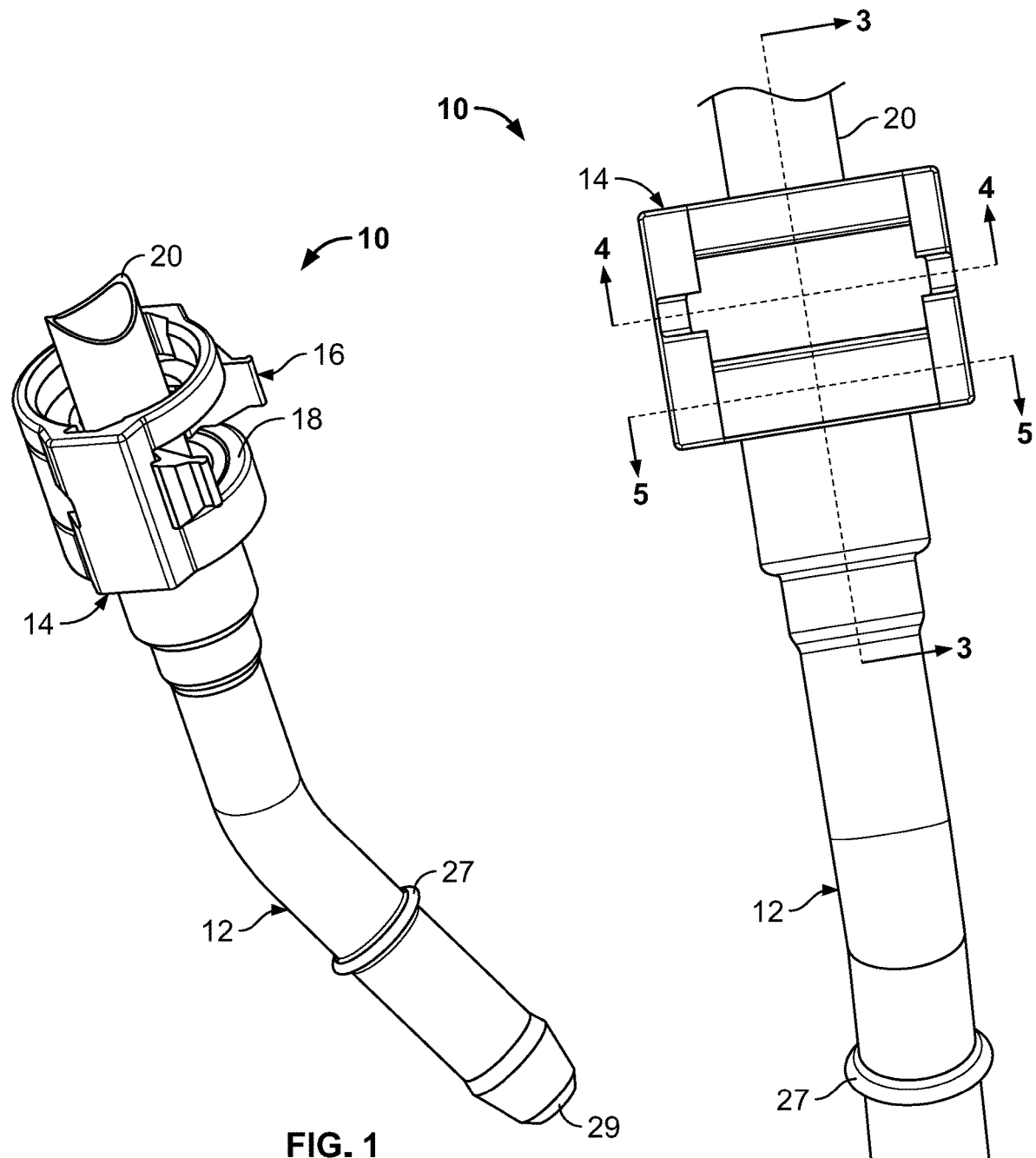
FIG. 1 is a perspective view of a quick connect assembly in accordance with the present teachings, the quick connect assembly shown operatively coupled with an endform.
FIG. 2 is a side view of the quick connect assembly of FIG. 1.
Figure 9:
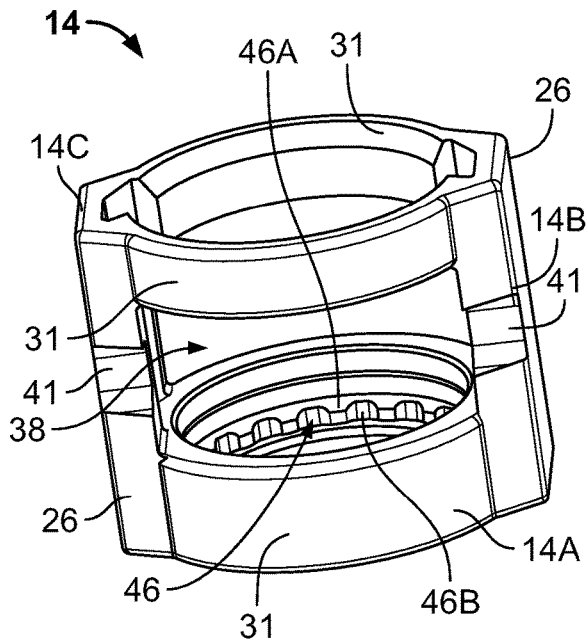
FIG. 9 is a perspective view of a collar member of the quick connect assembly of the present teachings.
Figure 10:
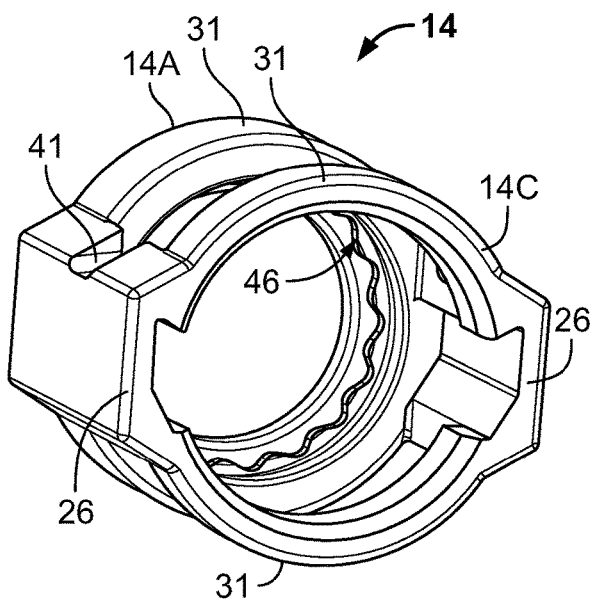
FIG. 10 is another perspective view of the collar member of FIG. 9.
Figure 11:
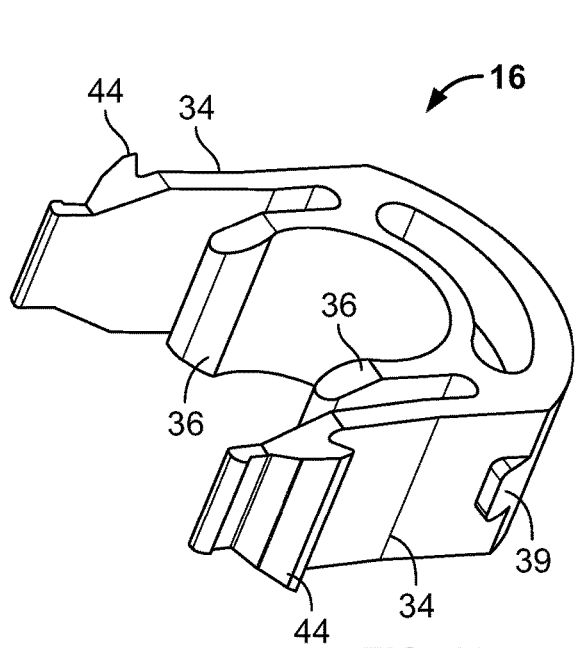
FIG. 11 is a perspective view of a retaining member of the quick connect assembly of the present teachings.
Figure 12:
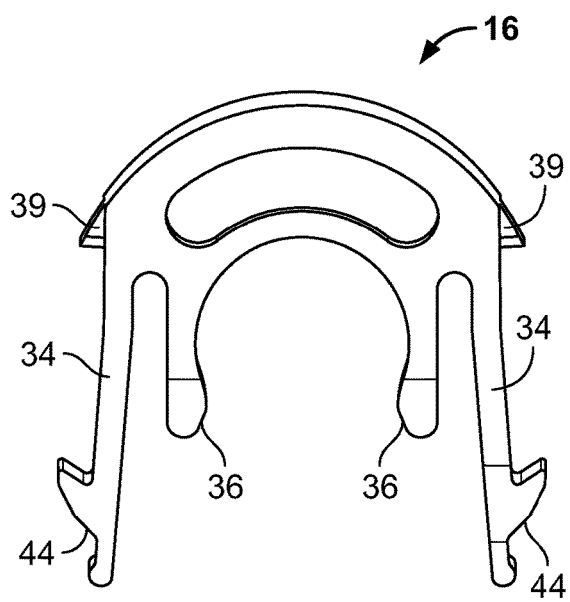
FIG. 12 is an end view of the retaining member of FIG. 11.

With reference to FIGS. 1 through 12 of the drawings, a quick connect assembly constructed in accordance with the present teachings is illustrated and generally identified at reference character 10. As illustrated, the quick connect assembly 10 may generally include a stem 12, a collar member 14 and a retaining member 16. The quick connect assembly 10 may also generally include a top hat or bearing 18. As will become more fully understood below, the collar member 14 may be positively located relative to the stem 12 to a plurality of fixed positions.

In FIGS. 1-5, the quick connect assembly 10 is shown operatively coupled with an endform 20. The endform 20 will be understood to be exemplary insofar as the present teachings are concerned. Briefly, the endform 20 includes a tubular body 22 and an annular bead 24 that circumferentially surrounds the tubular body 22.

In the exemplary embodiment illustrated, the quick connector assembly 10 may be used for the transmission of fluids in the form of gas or liquid. For example, the quick connector assembly 10 may be used in motor vehicle applications to couple various tubes and hoses to transmit vapors, ethylene glycol and other fluids. It will be appreciated, however, that the scope of the present teachings are not so limited and may readily be adapted for other vehicle applications or non-vehicle applications.

The stem 12 is a hollow tube having a radially extending flange 25 formed proximate to an upper end or proximal end of the stem 12. The stem 12 may further include an annular bead 27 and a tapered lower end or distal end 29. The stem 12 may be of any shape within the scope of the present teachings (e.g., straight, 45 degrees, 90 degrees, etc.). The stem 12 receives a tube (not shown) such as a rubber tube or a plastic tube in a conventional manner. The stem 12 may be constructed of metal or any other suitable material for the intended application of the quick connect assembly 10.

The collar member 14 may define a generally cylindrical opening and may include a pair of radially opposed sidewalls 26 interconnected by a plurality of arcuate segments 31. A pair of the arcuate segments 31 located at a lower or distal end of the collar member 14 may cooperate with the sidewalls 26 to define a distal portion or lower portion 14A of the collar member 14. Similarly, a pair of arcuate segments 31 locate at an upper or proximal end of the collar member 14 may cooperate with the sidewalls 26 to define a proximal or upper portion 14C of the collar member 14. A central portion 14B is positioned between the upper and lower portions 14A and 14B. The central portion 14B is bounded on opposite radial sides by the opposed sidewalls 26 and open in a radial direction between the sidewalls 26. The lower portion 14A of the collar member 14 includes a reduced diameter portion 30 for receiving the flange 25 of the stem 12.

The top hat 18 may cooperate with the retaining member 16 in a conventional manner to retain the collar member 14 to the stem 12. The top hat 18 may include a lower or distal portion 18A and an upper or proximal portion 18B. The lower portion 18A may be cylindrical shape and have a diameter sized to be received in the upper end of the stem 12. The upper portion 18B has a diameter larger than the diameter of the lower portion 18A. A stepped portion 18C of the top hat 18 abuts an upper side of the flange 25 of the stem 12. The top hat 18 may be received within the lower portion 14A of the collar member 14 such that the flange 25 is captured between the stepped portion 14C and a cooperating stepped portion 32 of the lower portion 14A of the collar member 14. Due to the snap-fit relationship, the top hat 18 may at least temporarily retain the collar member 14 relative to the stem 12 in an axial direction and preventing relative rotation of the collar member relative to the stem about the longitudinally extending axis. In this manner, the collar member 14 may be carried on the stem 12 prior to final assembly of the quick connector assembly 10 and the collar member 14 may be rotatably adjusted on the stem 12 to a desired orientation.

The top hat 18 may be a single, integral, monolithic unitary component made of a single component. The top hat 18 is unitarily constructed of a thermoplastic material. In one particular application, the top hat 18 may be constructed of a polyamide such as polyphthalamide (PPA). It will be appreciated, however, that other materials may be used within the scope of the present teachings.

The retaining member 16 may be constructed as a one-piece body of a suitable plastic, such as polyphthalamide (PPA), for example. The retaining member 16 may function to more securely retain the collar member 14 relative to the stem 12 in the axial direction A and also functions to retain the endform 20 to the quick connector assembly 10. In the embodiment illustrated, the retaining is illustrated to generally include an end wall 33, an outer pair of arms 34 and an inner pair of arms 36. The end wall 33 may be arcuate in shape and may include an axially extending opening 35. In other applications within the scope of the present teachings, the end wall 33 may be planar and the end wall may be solid. The arms of the outer and inner pair of arms 34 and 36 extend from the end wall 33 and have a height in the axial direction A that may be received in an axially extending window 38 of the central portion 14B of the collar member 14 as described hereafter.

The inner arms 36 both have arcuate inner surfaces 42 for engaging the endform 20 in a surface area contact. Both of the inner arms 36 has an enlarged end adapted to engage the endform 20 in the radial direction such that the inner arms 36 are urged radially outward enabling the inner arms 36 to slide around and then snap back into registry with the outer diameter of the endform 20. In this regard, the inner arms 36 may be elastically deflected generally in a radially outward direction.

The outer arms 34 may be formed to include barbs or hook-shaped latched projections 44 proximate and end of each outer arm 34. The barbs 44 may latch the retaining member 16 to the collar member 14 and thereby prevent inadvertent withdrawal of the retaining member 16 from its assembled position within the window 38. The outer arms 34 may be elastically deflected from the position shown in FIG. 4, for example, such that the outer arms 34 pass through the window 38 and resiliently return to a wider position (shown in FIG. 4) to secure the retaining member 16. The barbs 44 may define lead-in surfaces that cooperate with an inner surface of the central portion 14B of the collar member to inwardly deflect the outer arms 34 generally in a radial direction as the retaining portion 16 is inserted.

The retaining member 16 may be further formed to include a pair of projections 39 laterally extending from the end wall 33. The projections 39 are sized to be received in corresponding recesses 41 defined by the collar member 14. The recesses 41 may be located in the opposed sidewalls 26 and face in a common direction such that the retaining member 16 may only be fully inserted into the window 38 of the collar member 14 from a single side of the collar member 14.

As perhaps best shown in the assembled cross-sectional view of FIG. 3, the retaining member 16 further blocks movement of the top hat 18 in the axial direction A. The retaining member 16 further blocks withdrawal of the endform 20 from the quick connector assembly 10. In this regard, the bead 24 of the endform 20 is axially captured between a lower end of the inner arms 36 and the stepped portion 18C of the top hat 18.

As with the top hat 18, the retaining member 16 may be a single, integral, monolithic unitary component made of a single component. In one application, the retaining member 16 is unitarily constructed of a thermoplastic material. In one particular application, the top hat 18 may be constructed of a polyamide such as polyphthalamide (PPA). It will again be appreciated, however, that other materials may be used within the scope of the present teachings.

The collar member 14 and the stem 12 cooperate in such a manner that the collar member 14 is carried by the stem 12 and rotatably adjustable relative to the stem 12 about a longitudinally extending axis. The collar member 14 may be rotatably adjusted to a plurality of indexed positions and locked relative to the stem 12 in each of the indexed positions. To this end, the collar member 14 may be provided with a first plurality of locating features 46 and the stem 12 may be formed with a cooperating second plurality of locating features 48. The first plurality of locating features 46 may include one of a plurality of radially extending projections and radially extending recesses and the second plurality of locating features 48 may include the other of a plurality of radially extending projections and radially extending recesses. In the embodiment illustrated, the first plurality of locating features 46 of the collar member 14 includes a plurality of projections 46A that inwardly extend from the lower portion 14A of the collar member 14 and are positioned circumferentially thereabout. The plurality of projections 46A may be equally spaced about an inner surface of the lower portion 14A of the collar member 14. The first plurality of locating features 46 may additionally include a plurality of recesses 46B interleaved with the projections 46A.

Further in the embodiment illustrated, the second plurality of locating features 48 of the stem 12 similarly includes a plurality of projections 48A and a plurality of recesses 48B. The plurality of projections and recesses 48A and 48B are defined by the flange 25 of the stem 12. The projections 48A extend radially outward and engage corresponding recesses 46B of the collar member 14. The recesses 48B are interleaved with the projections 48A and receive a corresponding projection 46A of the collar member 14.

Prior to engagement of the endform 20 with the quick connector assembly 10, the stem 12 is connected with the remainder of the quick connector assembly 10. The stem 12 is inserted into the upper end of the collar member 14 and passed through the collar member 14 seats therein. The stem 12 may be rotationally indexed to a desired position of a plurality of positions. The radially extending flange 25 of the tubular stem 12 is seated against an inwardly extending lip of the collar member 14 and the first plurality of locating features defined by the tubular stem 12 engage with the second plurality of locating features of the collar member 14 to prevent relative rotation between the tubular stem 12 and the collar member 14.

The top hat 18 is inserted into the open upper end of the collar member 14 until the stepped portion 18C of the top hat 18 is seated on the flange 25 of the stem 12. The top hat 18 is received within the collar member 14 in a snap-fit, thereby at least temporarily retaining the stem 12 in an axial direction. By blocking axial movement of the stem 12 relative to the collar member 14, the top hat 18 maintains engagement of the first and second pluralities of locating features and thereby maintains the collar member 14 in the desired rotational position on the stem 12.

The endform 20 is inserted into an axially extending passage of the collar member 16 and the retaining member 16 is inserted in a radial direction into the window 38 defined by the collar member 14. The endform 20 elastically deforms the second pair of arms 36 radially outward as the second pair of arms 34 are elastically deformed radially inward. Upon full insertion of the retaining member 16, the first pair of arms 36 elastically return in a radially inward direction and receive the endform 20 in a snap-fit. The first pair of arms 34 elastically return in a radially outward direction and the barbs 44 prevent inadvertent withdrawal of the retaining member 16.

It will be appreciated that the present teachings provide a quick connect assembly with an indexable stem that can accommodate different retainer head positions for customer preference. The quick connect assembly prevents head rotation during service, making assembly line workers more efficient (e.g., less time to rotate head to proper position). The quick connect assembly of the present teachings may be readily adapted for use on all configurations of stems (e.g., straight, 45°, 90°, etc.).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A quick connect assembly for releasably engaging an endform, the quick connect assembly comprising:
   a tubular stem comprising a radially extending flange formed proximate to an upper end of the tubular stem; and
   a collar member comprising an upper end and a lower end, the lower end having a reduced diameter portion relative to the upper portion for receiving the flange of the tubular stem when the tubular stem is inserted through the upper end of the collar member and passed through to the lower end, the collar member being carried by the tubular stem and rotatably adjustable relative to the tubular stem about a longitudinally extending axis to a plurality of indexed positions;
   wherein the collar member is lockable relative to the tubular stem in each position of the plurality of indexed positions.

2. The quick connect assembly of claim 1, further comprising a retaining member, the collar member defining a window open in a radial direction and that receives the retaining member.

3. The quick connect assembly of claim 1, wherein the collar member includes a first plurality of locating features and the tubular stem includes a cooperating second plurality of locating features.

4. The quick connect assembly of claim 3, wherein the first plurality of locating features includes one of a plurality of radially extending projections and radially extending recesses and the second plurality of locating features includes the other of a plurality of radially extending projections and radially extending recesses.

5. The quick connect assembly of claim 3, wherein the radially extending flange of the tubular stem is formed to include the second plurality of locating features.

6. The quick connect assembly of claim 5, wherein the reduced diameter portion of the collar member defines an inwardly extending lip, wherein the first and second pluralities of locating features cooperate to prevent relative rotation between the collar member and the tubular stem when the radially extending flange of the tubular stem is seated against the inwardly extending lip.

7. The quick connect assembly of claim 6, further comprising a retaining member for holding the radially extending flange of the tubular stem against the inwardly extending lip, the retaining member comprising an inner pair of arms for engaging an endform and an outer pair of arms for securing the retaining member to the collar member.

8. The quick connect assembly of claim 1, further comprising a top hat that is configured to be received by the collar member in a snap-fit and to temporarily retain the collar member relative to the tubular stem an axial direction and prevent relative rotation of the collar member relative to the tubular stem about the longitudinally extending axis.

9. The quick connect assembly of claim 8, further comprising a retaining member blocking axial movement of the top hat such that the top hat in turn blocks axial movement of the tubular stem relative to the collar member.

10. The quick connect assembly of claim 1, in combination with the endform.

11. A quick connect assembly for releasably engaging an endform, the quick connect assembly comprising:
    a tubular stem including a radially extending flange formed proximate to an upper end, the radially extending flange formed to include a first plurality of locating features;
    a collar member comprising an upper end and a lower end, the lower end having a reduced diameter portion relative to the upper portion for receiving the flange of the tubular stem when the tubular stem is inserted through the upper end of the collar member and passed through to the lower end, the collar member being carried by the tubular stem and rotatably adjustable relative to the tubular stem about a longitudinally extending axis to a plurality of indexed positions, the collar member including an inwardly extending lip proximate a lower end thereof and further including a second plurality of locating features; and
    a retaining member for holding the radially extending flange of the tubular stem against the inwardly extending lip of the collar member,
    wherein the first and second pluralities of locating features cooperate to prevent relative rotation between the collar member and the tubular stem when the radially extending flange of the tubular stem is held against the inwardly extending lip of the collar member.

12. The quick connect assembly of claim 11, wherein the first plurality of locating features includes one of a plurality of radially extending projections and radially extending recesses and the second plurality of locating features includes the other of a plurality of radially extending projections and radially extending recesses.

13. The quick connect assembly of claim 11, further comprising a top hat for temporarily retain the collar member relative to the tubular stem in an axial direction and preventing relative rotation of the collar member relative to the tubular stem about the longitudinally extending axis.

14. The quick connect assembly of claim 13, wherein the retaining member blocks axial movement of the top hat such that the top hat in turn blocks axial movement of the tubular stem relative to the collar member.

15. The quick connect assembly of claim 11, in combination with the endform.

16. A method of coupling a tubular stem with an endform, the method comprising:

providing a quick connect assembly including a collar member;

passing the tubular stem through the collar member until a radially extending flange of the tubular stem is in a location proximate to an inwardly extending lip at a lower end of the collar member;

rotatably adjusting the collar member relative to the tubular stem about a longitudinally extending axis to one of a plurality of indexed positions; and seating the radially extending flange of the tubular stem against the inwardly extending lip of the collar member such that a first plurality of locating features defined by the tubular stem cooperates with a second plurality of locating features of the collar member to prevent relative rotation between the tubular stem and the collar member.

17. The method of claim 16, further holding the radially extending flange of the tubular stem against the inwardly extending lip of the collar member with a retaining member.

18. The method of claim 16, further comprising temporarily retaining the collar member relative to the tubular stem in an axial direction by inserting a top hat that is received by the collar member in a snap-fit and that prevents relative rotation of the collar member relative to the tubular stem about the longitudinally extending axis.

19. The method of claim 18, wherein the retaining member blocks axial movement of the top hat such that the top hat in turn blocks axial movement of the tubular stem relative to the collar member.

* * * * *